United States Patent [19]

Congdon et al.

[11] 4,090,763
[45] May 23, 1978

[54] CORDAGE FOR USE IN TELECOMMUNICATIONS

[75] Inventors: Wayne Irving Congdon, Indianapolis, Ind.; John Joseph Mottine, Red Bank, N.J.; William Charles Vesperman, Baltimore, Md.

[73] Assignees: Bell Telephone Laboratories Incorporated, New York, N.Y.; Bell Telephone Laboratories, Murray Hill, N.J.

[21] Appl. No.: 679,282

[22] Filed: Apr. 22, 1976

[51] Int. Cl.² ............................................ H01R 13/58
[52] U.S. Cl. ............................ 339/103 M; 174/113 C;
174/117 F
[58] Field of Search ............ 174/113 C, 113 R, 117 F,
174/131 A; 339/103 M, 103 R, 28, 29 R, 55 M

[56] References Cited

U.S. PATENT DOCUMENTS

| | | | |
|---|---|---|---|
| 2,573,439 | 10/1951 | Henning | 174/113 C X |
| 3,037,068 | 5/1962 | Wessel | 174/113 C X |

*Primary Examiner*—Roy Lake
*Assistant Examiner*—DeWalden W. Jones
*Attorney, Agent, or Firm*—E. W. Somers

[57] ABSTRACT

Cordage suitable for use, for example, in spring telephone cords which connect a telephone handset to a telephone base and a line cord which connects the telephone base to a wall terminal includes a plurality of tinsel conductors individually insulated with a polyether polyester thermoplastic copolymer obtained by reacting 1, 4 butane diol terephthalate with terephthalate esters of polytetramethylene glycol and stabilized with a long chain hindered phenolic antioxidant, tubed over each of the conductors, and a jacket comprising a plasticized polyvinyl chloride composition. The polyether polyester copolymer provides the cordage unexpectedly with superior mechanical properties such as, for example, resiliency, flex life and creep resistance. Spring cords of the above-described construction exhibit outstanding extensile and retractile properties.

15 Claims, 3 Drawing Figures

CORDAGE FOR USE IN TELECOMMUNICATIONS

BACKGROUND OF THE INVENTION

1. Field of the Invention

This invention relates to cordage for use in telecommunications, and, more particularly, but not exclusively, to a helically wound cord of the type used in the telephone communications industry and which includes a plurality of tinsel conductors, each conductor being covered with an insulative composition comprising a polyether polyester thermoplastic composition tubed thereover, and a plasticized polyvinyl chloride jacket encompassing the insulated conductors.

2. Description of the Prior Art

Cords used on telephone instruments to connect a handset to a base must have sufficient retractility to insure that they will return promptly to their normal retracted form after having been extended and then released. However, such cords which are commonly known as spring cords must not be so strongly retractile that they require an excessive amount of force to extend them. If a spring cord is too unyielding, instead of the cord extending when a pull is exerted thereon, the instrument to which it is attached may be moved on or pulled from its support. Readily extensible spring cords are desirable particularly when the spring cords are connected to lightweight desk-type or bedroom-type telephone handsets. Further, it is economically desirable to obtain an extended length with as short a length of cordage as possible and, from an appearance standpoint, it is desirable that the retracted length of the spring cord be as short as possible.

Spring cords of the type used on telephone instruments are generally constructed of highly flexible cordage having a plurality of individually insulated, mandrelated tinsel conductors. Each of these tinsel conductors is made by wrapping a plurality of thin tinsel ribbons of a Phosphor-bronze material spirally around a multi-filament nylon center core. In the past, the tinsel conductor was covered with a nylon knit and then insulated with a pressure-extruded polyvinyl chloride (PVC) composition. Subsequently, the plurality of individually insulated conductors were jacketed with a PVC composition. This construction was designed to permit the repetitive flexure of the cordage for a relatively large number of times as encountered during normal usage and also to permit the cordage to be wound helically during the formation of the spring cords. See, for example, U.S. Pat. No. 3,037,068 issued May 29, 1962 in the name of H. L. Wessel, incorporated by reference hereinto.

The cordage may be formed into a spring cord in a conventional manner. See, for example, U.S. Pats. No. 2,920,351 and 3,024,497 issued on Jan. 12, 1960 and on Mar. 13, 1962, respectively in the names of E. C. Hardesty and D. L. Myers and copending commonly assigned application Ser. No. 641,003 filed Dec. 15, 1975 and now U.S. Pat. No. 3,988,092, all incorporated by reference hereinto.

This complex construction was also necessary because of stringent service requirements placed on telephone cords. The served tinsel conductor construction provided a high degree of cut-through protection to the PVC insulation during flexing. Suitable conductor tensile strength and crush resistance properties were also obtained with this construction. The resilient, plasticized PVC jacket compound which was pressure-extruded over the insulated conductors provided a protective outer jacket and maintained the position of the individual conductors in a round configuration. The above-described cordage design was determined to be suitable for the production of (1) a flexible straight mounting or line cord which connects the telephone housing to a wall terminal and (2) a retractile cord which connects the handset to the telephone housing.

A new modular concept in telephone cordage design includes the replacement of individual spade-tipped conductors with a modular plug connection. Jacks adapted to receive the plugs are mounted in the telephone housing or base and in a wall terminal thereby permitting easy replacement of either the line or spring cord by a customer or an installer. See, for example, U.S. Pat. Nos. 3,699,498 and 3,761,869 issued Oct. 17, 1972 and Sept. 25, 1973, respectively in the names of E. C. Hardesty, C. L. Krumreich, A. E. Mulberger, Jr. and S. W. Walden, and U.S. Pat. No. 3,860,316 issued Jan. 14, 1975 in the name of E. C. Hardesty, all incorporated by reference hereinto.

Conversion to modularity and its associated plug-terminated cordage necessitated the development of telephone cordage having a smaller cross-section than that used in the past. A cordage design suitable for use with the modular plugs incorporated smaller conductors arranged in a parallel relationship, positioned in a single plane, and encapsulated with a somewhat oval-shaped jacket. In addition to reduced installation costs, the modular cord design offered other potential benefits such as, for example, (1) smaller, lighter weight telephone cords requiring less PVC; (2) in-plant mechanization of cord finishing thereby eliminating manual operations; and (3) replacement of the various color-coded conductors with a single color made possible by the single plane parallel arrangement of conductors for easy identification.

As mentioned hereinabove, the dimensional constraints imposed by the modular plugs and jacks necessitated a reduction in the overall size of both the insulated conductors and jacketed, oval-shaped flat cordage. To reduce the size of the insulated conductor, it was necessary to eliminate the knitted nylon covering over the served tinsel. The elimination of the protective nylon knit made it necessary to develop a tough insulation material which would function as a high strength barrier to the cutting action of the tinsel ribbon, as an electrical insulation over the tinsel conductor, and as the primary component to achieve resiliency in a retractile telephone cord. A plasticized nylon insulation replaced the knitted nylon covering over the served tinsel conductor and the outer PVC insulation material over the knit.

The use of nylon in insulating the tinsel conductors has not been altogether satisfactory. In present day markets, the nylon material is costly. In addition, nylon is a highly hygroscopic material and requires special handling to avoid moisture absorption. Moreover, portions of the tinsel ribbon occasionally protrude outwardly and cause protuberances in the slow-crystallizing nylon insulation. As a result, the nylon insulated conductors must be rewound and passed through a die to eliminate the protuberances. The plasticized nylon also has a tendency to creep under load, thereby diminishing somewhat the effectiveness of the strain relief system in the modular plugs disclosed in U.S. Pats. 3,699,498, 3,761,869 and 3,860,316.

It is desirable to insulate the tinsel conductors with a material which has all the beneficial properties of nylon, yet which is less costly. Ideally, the insulation composition would be one which crystallizes quickly after extrusion so that when it draws down on the conductive ribbons in a tubing extrusion operation, the upstanding metal portions will be compressed by the insulating material.

SUMMARY OF THE INVENTION

An article constructed in accordance with certain features of the invention includes a tinsel conductor served about a polymeric core and provided with a tubular insulated covering of a thermoplastic composition spaced from the core, the composition being a polyether polyester copolymer composition obtained by reacting 1,4 butane diol terephthalate with terephthalate esters of polytetramethylene glycol (PTMEG). The nominal weight percent of the constituents of the composition includes about 15.7 percent of PTMEG, about 32.4 percent of 1, 4 butane diol and about 50.7 percent of a terephthalate ester - containing compound, such as, for example, terephthalic acid. The composition may be stabilized with a long chain hindered pheonolic non-discoloring anti-oxidant system offering stabilizer migration resistance. The combination of the constituents is such that the insulation has a Durometer hardness on the D scale in the range of approximately 72 and a flexural modulus of approximately 75,000 pounds per square inch.

The insulation composition also includes a color concentrate comprising a second polyester copolymer which unexpectedly functions as a processing aid when extrusion-coating the composition about the tinsel conductor.

Cordage may be constructed having a plurality of tinsel conductors each wrapped about a longitudinal center core and constructed so that each conductor is insulated individually with the polyether polyester thermoplastic material disclosed hereinbefore. The extruded insulation crystallizes rapidly to draw down about the core in a consistently oval-shaped configuration. The plurality of individually insulated conductors are enclosed with a jacket comprising a plasticized polyvinyl chloride composition with, the resultant cordage destined to be used in the production of cords for use with telephone station apparatus, for example.

A length of the cordage may be helically wound, heat set and reverse wound, and terminated with suitable electrical connecting devices to provide a retractile telephone cord, commonly referred to as a spring cord, for connecting a telephone base to a telephone handset. An uncoiled cord of the same construction produces an excellent line cord for connecting the telephone base to a wall terminal.

BRIEF DESCRIPTION OF THE DRAWINGS

Other objects and features of the present invention will be more readily understood from the following detailed description of specific embodiments thereof, when read in conjunction with the accompanying drawings, in which.

DETAILED DESCRIPTION

Figure 1:
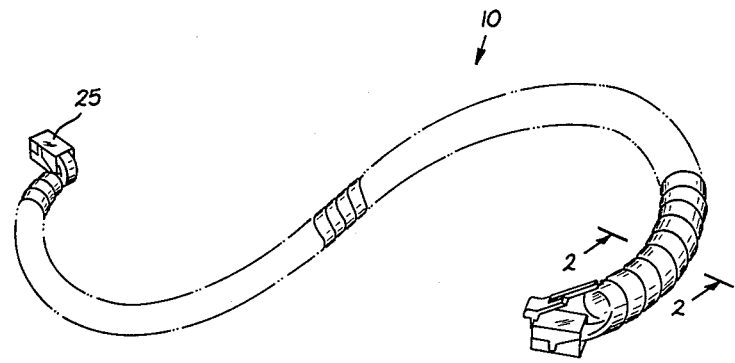
FIG. 1 is a view of a spring cord embodying certain principles of the present invention.
Figure 2:
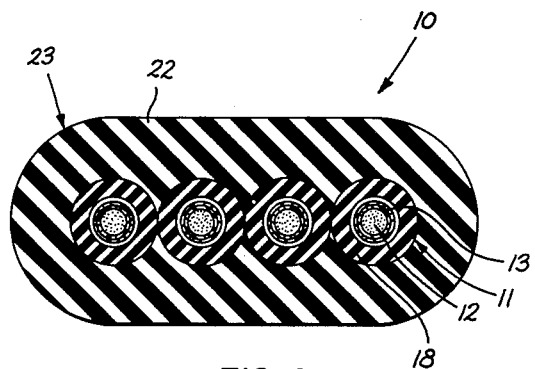
FIG. 2 is an enlarged sectional view of the spring cord of FIG. 1, taken along line 2—2 thereof.

Referring now to the drawings, there is shown a retractile or spring cord, designated generally by the numeral 10. It should be understood that while the invention is described in terms of a spring cord, the principles of this invention are not so limited and are applicable generally to cordage which includes a jacketed plurality of individual conductors or on insulated conductors destined for spring cord use.

Figure 3:
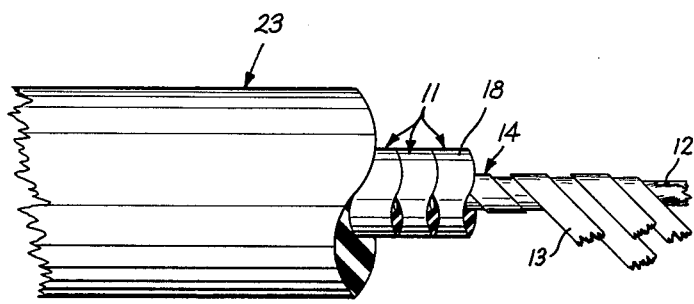
FIG. 3 is an enlarged, fragmentary view of a section of flexible cordage prior to having been formed into the spring cord of FIG. 1, with portions thereof broken away for purposes of clarity.

The spring cord 10 is the type which is used on telephone instruments and which includes a plurality of insulated tinsel conductors, designated generally by the numerals 11—11. Each of the insulated tinsel conductors 11—11 includes a nylon multi-filament center core, designated generally by the numeral 12, about which a plurality of tinsel ribbons 13—13, made typically from a Phosphor-bronze material are wrapped spirally to form a tinsel conductor, designated generally by the numeral 14 (see FIG. 3).

An insulating covering 18 of a suitable plastic material, which in accordance with the principles of this invention is a polyether polyester thermoplastic material, is extrusion-tubed over the tinsel conductor 14 to form one of the insulated tinsel conductors 11—11. The served tinsel conductor construction provides a high degree of flexibility and fatigue life as compared to a solid conductor design.

The insulating covering 18 must be capable of satisfying the dimensional constraints imposed by the hereinbefore described modular devices to which the cord 10 is assembled. This has generally been accomplished by the elimination of the priorly-used knitted nylon covering over the individual served tinsel conductors. The nylon knit component was a major contributor to the overall resilience of priorly constructed spring cords. Resilience is a measurement of the ability of a retractile telephone cord when extended under a specified load, e.g., 250 grams, for 5 minutes to return to its unextended original shape when the load is removed after a period of an additional five minutes. In summary, conductor insulation material is required to function as a high strength barrier to the cutting action of the served tinsel ribbon conductor, as an electrical insulation over the tinsel conductor, and the primary component to achieve resiliency in a retractile cord.

The basic insulation polymer which is utilized in the inventive construction is a thermoplastic material, a polyether polyester block copolymer obtained by reacting 1, 4 butane dial terephthalate with terephthalate esters of polytetramethylene glycol (hereinafter "PTMEG"). More particularly, the insulation 18 is a composition which includes approximately the following weight percent constituents: 15.7% PTMEG, having a number average molecular weight of about 1000, 32.4% of 1, 4 butane diol and 50.7% of a terephthalic ester-containing compound such as, for example, terephthalic acid. It will be observed that the composition comprising the insulation 18 is produced by reacting two glycols, i.e., the 1, 4 butane diol and the PTMEG, with the terephthalate ester-containing compound to form an ester and ether which results in a polyether polyester copolymer.

The foregoing composition also includes about 1% catalytic residue and is preferably stabilized with about 0.2% of a long chain hindered phenolic antioxidant such as, for example, (N,N'-hexamethylene bis (3, 5-diterbutyl-4-hydroxy-hydrocinnamide). This is a symmetrical diamide composed of 2 moles of 3, 5 diteriary butyl, 4 hydroxy hydrocinnamic acid and 1 mole of 1, 6 hexamethylene diamine. The long chain hindered phenolic antioxidant system offers migration resistance and is non-discoloring in the presence of ultraviolet light.

A composition, suitable for use in insulating the conductors 14—14 in accordance with this invention is a polyester polyether thermoplastic composition and is of the type disclosed in U.S. Pat. Nos. 3,651,014 and 3,763,109, both of which are incorporated by reference hereinto. See also U.S. Pat. No. 3,766,146, also incorporated by reference hereinto, for an elastomeric composition of reduced hardness.

An insulation composition suitable for constructing the cordage 10 in accordance with the principles of this invention is available presently from the E. I. duPont de Nemours & Co., Inc. of Wilmington, Del. under the trade designation HYTREL ® 7246, which is stabilized with an antioxidant available, for example, from the Ciba-Geigy Company of Arrdsley, N.Y. under the trade designation Irganox ® 1098. A color concentrate such as a polyester elastomer available commercially from duPont under the designation HYTREL ® 4056 and having a Durometer hardness as measured on the D scale of 40 combined with a pigment available from duPont, e.g. Pearl Afflair, may be added to the HYTREL ® 7246 composition. The first two digits of the HYTREL ® plastic designation indicates the hardness.

The composition comprising conductor insulation 18 is applied by using a tubed extrusion technique in which there is provided an air-induced space between the served tinsel conductor 14 and the tubed insulation 18. Extrusion of the polyester polyether thermoplastic composition is affected by extrusion temperatures and screw design since the insulation composition is characterized by rapid changes in melt viscosity with slight variations of polymer temperature. Moreover, the material undergoes a rapid transition between liquid and solid phases. These characteristics could result in non-uniform wall thickness and polymer flow pulsations.

Advantageously, the effects of these characteristics are offset by the addition to the extruder charge of the lower molecular weight lower hardness, and lower melting point polyester in the form of a color concentrate. The lower melting, i.e. 334° F, polyester HYTREL ® 4056 material stabilizes the melting point of the polymer in the extruder transition zone. In addition, the pigment portion of the color concentrate minimizes variations in melt viscosity of the polymer resulting in a more uniform extrusion process with improved size control of the critical dimensions. It was unexpected that the lower hardness HYTREL ® polyester which was used as a color concentrate would also function as a processing aid.

The air-induced space between the tinsel conductor 14 and the insulation 18 allows the conductor to move freely within the insulation thereby reducing conductor fatigue. With an average conductor outside diameter of about 20 mils and the size limitation imposed by a modular terminated cord 10, the tubular insulation 18 is limited to an outside diameter of not greater than 40 mils. The criticality of the outside diameter coupled with a 2 mil air space, necessitates a tubular wall thickness of about 8 mils. This thin wall construction mandates that the polyether polyester thermoplastic insulation material possess excellent mechanical strength, such as, for example, cut-through resistance, hardness, tensile and compression strength.

The polyester polyether thermoplastic insulation 18 undergoes rapid crystallization growth when cooled below the melt temperature. This rapid crystallization growth makes possible horizontal extrusion tubing of the irregular tinsel conductor while maintaining a nominal 8 mil wall and an outside diameter of 40 mils in addition to a 2 mil air space. This rapid crystallization growth allows the insulation material to develop the necessary strength and rigidity in order to maintain the design limitations.

The polyether polyester insulation 18 constructed in accordance with composition disclosed hereinbefore has a Durometer hardness of 72 as measured on the D scale and as determined in accordance with specification of the American Society of Testing Materials (ASTM D-2240), and a compression strength of 30,000 psi as determined in accordance with ASTM D-692. In comparison, priorly used plasticized nylon insulation exhibited a hardness of about 50 D. These characteristics provide crush resistance to the individual conductors 11—11, e.g. as where a telephone cord 10 would be caught in a sliding glass door (not shown) or between a wall and desk (not shown). Superior cut-through resistance is also provided thereby preventing the sharp tinsel conductor from cutting through the insulation 18 of a cord 10 upon flexing thus mantaining the integrity of the cord.

The insulation 18 exhibits a modulus of rigidity of approximately 75,000 psi as determined in accordance with ASTM D-790. This property allows the unknitted insulated conductor 11 to be processed and taken up in a barrel take-up system (not shown) without entanglement.

The high tensile strength of the polyether polyester thermoplastic insulation 18, i.e. 6,000 psi, as determined in accordance with ASTM D-638, in conjunction with the hardness and compression strength provides excellent plug-pull resistance, i.e. the force necessary to remove an end device from the cord 10 after termination to the cord. This prevents unintentional disconnection of the terminated cord 10.

HYTREL ® polyesters throughout the hardness range, i.e. HYTREL ® 4056 through HyTREL ® 7245, are described in some literature as polyester elastomer materials. The ASTM's Glossary of Definition's ASTM Definitions, second edition 1973, defines an elastomer as a natural or synthetic polymer which at room temperature can be stretched repeatedly to at least twice its original length and which after removal of the tensile load will immediately and forceably return to approximately its original length. Since the polyether polyester thermoplastic which comprises about 98% by weight of the insulation 18, i.e. the HYTREL ® 7246 composition, possesses a minimum permanent set of approximately 88% it should be construed as a thermoplastic, rather than an elastomeric, material.

HYTREL ® plastic materials are well described in E. I. duPont's brochure titled HYTREL ® Polyester Elastomer and having a designation A-99608. As disclosed in that brochure, HYTREL ® plastics span a range between rubber and rigid plastic materials with Durometer hardness, as measured on the A and D scales, ranging from 92 A to 63 D. Softer members of the series resemble elastomers more than plastics while the converse is true of the harder members of the series. Subsequent trade literature designated E-00862 discloses properties for a HYTREL ® plastic as having a Durometer hardness of 72 D and designated HYTREL ® 7245.

A plurality of the insulated tinsel conductors 11—11 are arranged in parallel, nontwisted, contiguous relationship with respect to each other so that the insulated conductors are symmetrical with respect to a common longitudinal axis therebetween. This arrangement facilitates identification by an installer and obviates the use of color-coded insulation.

A plastic insulating jacket 22 of a suitable plastic material is extruded over the insulated tinsel conductors 11—11 to form a jacketed cordage, designated generally by the numeral 23. A plastic material suitable for use as a jacketing material is that disclosed in U.S. Pat. No. 3,941,908 issued Mar. 2, 1976 in the names of M. P. Valia and W. C. Vesperman, and incorporated by reference hereinto.

The jacketed cordage 23 may be made into straight cords of various lengths by cutting indefinite lengths of the cordage to a desired length. Subsequently, one of the modular plugs 25—25 (see FIG. 1) made in accordance with the disclosure of hereinbefore mentioned U.S. Pat. Nos. 3,699,498, 3,761,869 or 3,860,316, is assembled to each end of the length of cordage 23 to form a straight line cord 10. See U.S. Pat. No. 3,895,434 issued July 22, 1975 in the names of G. P. Adams, F. D. Gavin and A. P. Natale.

The jacketed cordage 23 may also be formed into spring cords 10—10 of various lengths having different numbers of insulated conductors 11—11 therin. For example, the number of insulated conductors 11—11 are commonly three to eight, and the nominal extended lengths of the cords are commonly 4 feet, 5-½ feet, 9 feet and 13 feet. The spring cords 10—10 are formed preferably as disclosed in priorly identified U.S. Pat. No. 2,920,351, 3,024,497, and 3,988,092, all incorporated by reference hereinto.

The polyether polyester copolymer provides the cord generally with all the properties, and improved values thereof, which were provided by the nylon and, moreover, is characterized by rapid crystallization following extrusion. This latter characteristic advantageously avoids tearing or bulging or both of the insulation by periodically occurring tinsel burrs extending from the core.

Not only are these properties imparted to the cordage 23 by the polyester polyether copolymer, which is significantly less expensive than nylon, but the results were unexpected. For example, it will be recalled that a spring cord 10 is produced by winding a plurality of convolutions of cordage 23 on a mandrel (not shown) after which the wound cord is heat set by being exposed to elevated temperatures. Generally, it is assumed that the higher the melting point of the insulation the higher must be the heat-set temperature. The melting point of the plasticized mylon, i.e. about 365° F, is greater than the "melting point" of the PVC jacketing material i.e. temperature at which the plasticized PVC flows without coercion, which is about 285° F, but that of the HYTREL ® plastic is in excess of that of the nylon. The melting point of a polyether polyester copolymer insulating composition described hereinbefore is approximately 424° F. Therefore, it was expected that if the polyether polyester composition was used, a heatset temperature substantially higher than that for the nylon would be required to set the helices of the cordage 23 wound on a mandrel (not shown) to produce a retractile cord 10.

It would appear that if the polyether polyester copolymer insulation was heat-set at a higher temperature than that used for nylon, it could undesirably fuse to the PVC jacket 22. Moreover, a fusing together of adjacent ones of the convolutions of the helically wound cord 10 could occur. On the other hand, if the insulating material is not heated to a temperature in excess of that used to heat-set the priorly used lower melting point nylon, then it would be expected that it would not be heat set and that when it was removed from the mandrel (not shown), it would return to an uncoiled configuration and exhibit poor mechanical memory, i.e. creep resistance and retractility.

Surprisingly, even though the coiled cordage 23 having conductors insulated with a HYTREL ® plastic, having a Durometer hardness of 72 measured on the D scale and a melting point of 424° F is heated to a temperature substantially less than its melting point, the resultant cordage has excellent retractility-extensility characteristics. It was found that a temperature approximately the same as that used for the nylon, e.g. 260° F, was sufficient to heat set the polyether polyester thermoplastic material. Moreover, the nonplasticized polyether polyester copolymer composition avoids the problem of plasticizer migration thereby avoiding fusing of adjacent ones of the helices.

Upon termination, it is necessary to remove a portion of the outer jacket 22 exposing the individual conductors. Advantageously, the insulation 18 exhibits relatively high melting and softening temperatures of 424° and 397° F, respectively. This characteristic is important when the PVC jacket 22 is extruded over the plurality of individually insulated conductor 14—14. The high melting and softening temperature of the HYTREL ® prevents the lower "melting point," i.e. about 300° F, plasticized PVC jacket 22 from adhering to the individual insulated conductors 11—11 and causing termination problems.

Further surprising are the extensity-retractility properties of a cord 10 having conductors 11—11 insuated with a polyether polyester copolymer material. During the developement of a retractile cord having improved properties, a polyether polyester thermoplastic material having a Durometer hardness of 63 measured on the D scale was used. This resulted in unfavorable creep characteristics as well as poor retractility properties in that while the cord could be extended with an acceptable force, a longer time was required for the helices to retract than with the priorly used nylon insulation. In order to complete the investigation, a polyether polyester material having a Durometer hardness of 72 D was used. Since the literature discloses that the resilience of such a material decreases over that of a 63 D hardness material as well as having a higher melt point, it would be reasonable to assume that the extensility-retractility properties would worsen.

It will be recalled from the ASTM definition hereinbefore that an elastomer generally fully recovers from an extension while plastics do not. Therefore, it would be expected that the cord 10 of the present invention would not have the extensility-retractility properties of one which employed a truly elastomeric insulation. Suprisingly, the cord 10 constructed in accordance with the principles of this invention exhibits outstanding retractile-extensile properties.

That this result is surprising appears to be further strengthened from E. I. duPont's HYTREL® brochure HYT-501 and designated A-99590 on the back cover thereof and in particular of a FIG. 1 which shows a stress-strain relationship (ASTM D-412). There it can be seen that the lower hardness HYTREL® plastics exhibit classical S-shaped stress-strain curves of an elastomer. In the other hand, the harder HYTREL® plastics exhibit pronounced yield points at 50% and 25% strain, respectively, for 63 D and 72 D. It would hence appear that if either of those are strained beyond these limiting values, that they would develop an irreversible permanent set. Therefore, it would not appear that the retractile properties of a cord having conductors insulated with such a material would be acceptable because of poor recovery.

Further, the polyether polyester copolymer has a flexural modulus of approximately 75,000 psi as compared to 1,200 psi for vinyl and 50,000 psi for plasticized nylon. It was expected that the use of a polyester thermoplastic material having a modulus so much in excess of the plasticized nylon would result in a cord which required excessively high forces for extension thereof. This expectation seemed to be reinforced by the observation that cords having conductors insulated with lower modulus polymers, e.g., 30,000 to 50,000 psi, resulted in cords having excellent extensibility properties; however, these polymers did not have adequate creep, retractility and cut-through resistance. Surprisingly, the polyether polyester material having a 75,000 psi modulus resulted in a cord which demonstrated superior strength and extensibility properties.

The cord constructed in accordance with the principles of this invention exhibits superior resilient characteristics as compared to the conventionally plasticized, i.e. 60.0 parts of DOP per 100 parts of PVC resin PVC insulation material, and has a torsional resilience of one second as compared to fifteen seconds for the plasticized PVC insulation. Low temperature impact characteristics of the polyether polyester thermoplastic material are maintained to −94° F whereas those for the conventionally plasticized PVC insulation are maintained to −10° F, in accordance with ASTM D-746.

Further benefits accrue because the insulation 18 is a non-plasticized polymer as compared with the conventional, priorly used PVC or nylon insulation which require external plastification to achieve low temperature impact, resilient and acceptable flex modulus properties. Additional plasticized levels above 50.0 parts per hundred parts of PVC resin will improve both low temperature impact and resilient properties, but will substantially reduce the softening point of the PVC insulation thereby causing excessive jacket to conductor insulation adhesion.

During heat setting, it has not been uncommon that the plasticizers from PVC or nylon plasticized insulation migrated into the PVC composition jacket 22. This causes an undue softening of the jacket 22 with attendant fusion together of the jacket and conductors 11—11 thereby reducing the ability to remove the outer PVC jacket in order to expose the individual conductors in field stripping operations. Moreover, the softer jacket 22 causes, undesirably, adjacent ones of the convolutions of the helices of the coiled cord to adhere together. Plasticizer migration also contributes undesirably to deformation under load thereby affecting adversely strain relief systems of the plugs 25—25.

Also, the use of non-plasticized insulation allows the use of higher annealing temperatures, thus imparting improved stress relief to the mandrel-wound telephone cordage and promoting improved mechanical memory, resilience and creep resistance. Higher annealing temperatures are realized when using a non-plasticized insulation as opposed to using a conventionally plasticized PVC compound. Improved creep resistance, i.e., resistance to long term deformation under load of the initially set helical configuration which is attributed to higher annealing temperatures, is dramatized in the utilization of wall telephone sets where the cord 10 is suspended and hangs from the receiver. The polyether polyester thermoplastic insulated retractile cord 10 exhibits a creep deformation of 25% as compared to 48% for a standard PVC insulated cord over a four month period.

The use of the insulated conductors embodying the principles of this invention is advantageous in the termination of the cords 10—10 with the plugs 25—25 which are constructed as disclosed, for example, in earlier mentioned U.S. Pat. Nos. 3,699,498, 3,761,869, and 3,860,316 all incorporated by reference hereinto. It is important to the integrity of those cords that the strain relief provided for the jacket 22 and the insulated conductors 11—11 is maintained during customer use.

The hardness, improved crush resistance, improved resistance to creep and the characteristic of internal plasticizing provide the cord 23 with properties which cooperate with the plugs 25—25 to maintain the strain relief system. In the plug 25 disclosed in U.S. Pat. No. 3,860,316, for example, and incorporated by reference hereinto, a free end of the cord 22 is inserted into an unipartite housing of the plug 25 after which plastic portions of the housing are moved into engagement with the conductors 11—11 and with the jacket 22 to provide strain relief therefor during use. Advantageously, the polyester insulation does not exhibit appreciable creep under load and resists the tendency of the impacting portions to crush the plastic insulation. Also, externally added plasticizers in plasticized materials have a tendency to flow or shift when the material is subjected to load. This is avoided with the one of the internally plasticized polyether polyester materials which comprises the cord 10 embodying the principles of this invention.

It was believed that the specific gravity of the polyether polyester copolymer, i.e., 1.25 as compared with nylon 1.05, would add undesirably to the weight of the cord 10 and hence cause poor creep performance. Contrary to this expectation, the cord 10 having polyether polyester copolymer insulated conductors 11—11 displays creep resistance which is superior to that of a nylon-insulated conductor cord.

It may be observed from a table of properties that a polyether polyester material of the composition disclosed hereinbefore and as exhibited by HYTREL® 7246, for example, has a hardness of 72 D compared to 62 D for a plasticized nylon. While this characteristic might be expected to be detrimental to flex life in that such as property might result in excessive cracking, the opposite result occurred, i.e., the polyether polyester insulated cord 10 exhibited improved flex life.

The polyether polyester thermoplastic insulation exhibits exceptional chemical and oil resistant properties as well as non-yellowing antioxidation stability which offers a significant advantage. This characteristic makes possible the combination of a clear PVC outer jacket 22 with either colored or clear polyether polyester thermoplastic insulation to match various styled phone sets.

Several examples of the present invention are set forth below. A suitable extrusion apparatus is illustrated in U.S. Pat. No. 3,579,608 issued to J. B. DeCoste, and incorporated by reference hereinto.

EXAMPLE I

An extrusion apparatus having a length to diameter ratio to 24 to 1 and a barrel diameter of 2 inches was charged with a segmented thermoplastic copolyester to obtain an output of about 75 lbs/hr. The polyester comprises a plurality of recurring ester linkages such as, for example, esters of dicarboxylic acids and diols joined together into chain type molecules. At least 70% of the esters in the polyesters are derived from terephthalic acid, the remaining esters being essentially isophthalic or phthalic acid esters. The diols from which the polyester chain is derived are comprised of (1) a poly (alkalene oxide) glycol having a molecular weight of 400 to 4000 and a carbon-to-oxygen ratio in the range of 2.0 to 4.3 and (2) a poly (alkalene oxide) glycol having a molecular weight less than 250 and which comprises at least 70 percent of 1, 4 butane diol units. The proportion of the polymer which includes the poly (alkalene oxide) glycol having a molecular weight less than 250 is at least 66% by weight of the copolyester. The sum of the percentages of diacids present in the polyester which are not terephthalic acid, and the number of the short chain diol groups present which are not 1, 4 butane diol does not exceed about 30 percent.

The segmented thermoplastic copolyester is of the type disclosed in U.S. Pat. Nos. 3,651,014 and 3,763,109, both incorporated by reference hereinto, and is available commercially from the E. I. duPont de Nemours Company under the designation HYTREL® 7246 Polyester Elastomer, for example.

The feed zone temperature was 450° F, the transition zone temperature was measured at 430° F, the metering zone temperature at 395° F, and the head temperature at 450° F. The amperage of the electrical current driving the extruder screw varied between 14 and 32. A tinsel conductor 14 was advanced through the extrusion head at a line speed of about 2500 feet per minute and was coated with the extrudate to form an insulative cover 18 having a wall thickness of about 7 mils and an outside diameter of about 40 mils.

EXAMPLE II

This example was conducted under the same conditions as those of Example I except that the extruder charge comprised approximately (a) 97% of a first segmented thermoplastic copolyester comprising a plurality of recurring ester linkages such as, for example, esters of dicarboxylic acids and diols joined together into chain type molecules. At least 70 percent of the esters in the polyester are derived from terephthalic acid, the remaining esters being essentially isophthalic or phthalic acid esters. The diols from which the polyester chain is derived are comprised of (1) a poly (alkalene oxide) glycol having a molecular weight of 400 to 4000 and a carbon-to-oxygen ratio in the range of 2.0 to 4.3 and (2) a poly (alkalene oxide) glycol having a molecular weight less than 250 and which comprises at least 70 percent of 1, 4 butane diol units. The proportion of the polymer which includes the poly (alkalene oxide) glycol having a molecular weight less than 250 is at least 66% by weight of the copolyester. The sum of the percentages of diacids present in the polyester which are not terephthalic acid, and the number of the short chain diol groups present which are not 1, 4 butane diol does not exceed about 30 percent. The charge comprised about 97% of the first segmented polyester combined with (b) approximately 1.5% of a second segmented thermoplastic copolyester comprising a plurality of recurring ester linkages such as, for example, esters of dicarboxylic acids and diols joined together into chain type molecules. At least 70 percent of the esters present in the second polyester are terephthalic acid, the remaining esters being essentially isophthalic or phthalic acid esters. The diols from which the second polyester chain is derived are comprised of (1) a poly (alkalene oxide) glycol having a melting point of less than about 60° C, a molecular weight of 400 to 4000, and a carbon-to-oxygen ratio in the range of 2.0 to 4.3, and (2) a poly (alkalene oxide) glycol having a molecular weight less than 250 and which comprises at least 70 percent of 1, 4 butane diol units. The proportion of the polymer which includes the poly (alkalene oxide) glycol having a molecular weight less than 250 is about 48 to 65 percent by weight of the copolyester. The sum of the percentages of diacids present in the polyester which are not terephthalic acid and the number of the short chain diol groups present which are not 1, 4 butane diol does not exceed about 20 percent. The second segmented polyester is available commercially from E. I. duPont de Nemours under the designation HYTREL® 4056 Polyester Elastomer, for example. Further, the charge comprises (c) approximately 1.5% of a silver pigment such as, for example, Pearl Afflair, available commercially from E. I. duPont de Nemours. The amperage of the current required to drive the extruder screw was measured to be in the range of 19 to 20.5 which seemed to indicate that the composition of Example II is characterized by greater stability than that of Example I and results in a more uniform product. The HYDREL® 4056 material is of the type disclosed in U.S. Pat. No. 3,766,146, incorporated by reference hereinto.

The properties of the insulation cover 18 in both examples were found to be essentially those published by duPont for the HYTREL® 7246 Polyester Elastomer.

It is to be understood that the above-described arrangements are simply illustrative of the invention. Other arrangements may be devised by those skilled in the art which will embody the principles of the invention and fall within the spirit and scope thereof.

What is claimed is:

1. A cord, comprising:

a plurality of individually insulated tinsel conductors each having a polymeric core and a plurality of electrically conductive, flexible tinsel ribbons wrapped spirally about the core;

an insulation cover encompassing each individual tinsel conductor, which is obtained by reacting 1, 4 butane diol terephthalate with terephthalate esters of polytetramethylene glycol and which comprises approximately 15.7 percent by weight of polytetramethylene glycol having a number average molecular weight of about 1,000, about 32.4 percent by weight of 1, 4 butane diol, and about 50.7 percent by weight of a terephthalate ester-containing compound; and a plasticized polyvinyl chloride jacket covering the individually insulated tinsel conductors.

2. The cord of claim 1, wherein the insulation composition has a Durometer hardness on the D scale of approximately 72 and a modulus of rigidity of approximately 75,000 psi.

3. The cord of claim 1 wherein the insulation cover further comprises a composition which includes about 19.4 percent by weight of 1, 4 butane diol, about 44.8 percent by weight of polytetramethylene glycol having a number average molecular weight of 1000, about 27.4 percent by weight of terephthalic acid and about 7.9 percent by weight of isophthalic acid.

4. The cord of claim 1, wherein the composition also comprises about 0.2 percent by weight of a long chain hindered phenolic antioxidant.

5. The cord of claim 1, wherein the insulation composition has a melting point of about 424° F, a melt index of about 12.0 and a specific gravity of about 1.25.

6. The cord of claim 1, wherein the melting point of the insulative composition is about 424° F and the plasticized polyvinyl chloride which comprises the jacket comprises about 60 parts of a plasticizer per 100 parts by weight of polyvinyl chloride, the melting point of the insulative cover composition being substantially greater than the temperature at which the jacket will flow without coercion.

7. A telephone cord, which comprises:
an electrical connector, which includes a housing having at least one movable portion to provide a strain relief system for the cord; and
a length of cordage which is assembled to the housing and which includes:
a core;
a plurality of electrically conductive flexible tinsel ribbons wrapped about the core to form a conductor;
an insulation material which includes a polyether polyester block copolymer composition obtained by reacting a terephthalate ester group of a compound with 1, 4 butane diol and with terephthalate esters of polytetramethylene glycol characterized by a Durometer hardness measured on the D scale of approximately 72; and
a plasticized polyvinyl chloride jacket covering the insulated conductors and engaged by the at least one movable portion of the housing to anchor the cordage within the housing.

8. The cord of claim 7, wherein the flexural modulus of the insulating composition is approximately 75,000 pounds per square inch.

9. The cord of claim 7, wherein the insulation composition includes approximately 15.7 percent by weight of polytetramethylene glycol, about 32.4 percent by weight of 1, 4 butane diol and 50.7 percent by weight of terephthalic acid, the composition of the insulation being stabilized with a long chain hindered phenolic antioxidant.

10. The cord of claim 9, which also includes approximately 1 percent by weight of a catalytic residue and approximately 0.2 percent by weight of the antioxidant.

11. The cord of claim 9, wherein the housing is an unipartite housing and the moveable portion thereof is moveable into engagement with the jacket after the cord is inserted into the housing and locked in position between non-moveable portions of the housing and the cord.

12. An insulated conductor, destined to be associated with at least one other insulated conductor and jacketed with a plastic material to form cordage suitable for producing a retractile cord comprising a plurality of helically wound convolutions of the cordage and terminated at least at one end thereof with an electrical connector having strain relief facilities, the conductor comprising a polymeric cord, at least one electrically conductive, flexible tinsel ribbon wrapped spirally about the core, and an insulative cover encompassing the tinsel ribbon and which is obtained by reacting a terephthalate ester group of a compound with 1, 4 butane diol terephthalate and with terephthalate esters of polytetramethylene glycol and which comprises approximately 15.7 percent by weight of polytetramethylene glycol having a number average molecular weight of about 1000, about 32.4 percent by weight of 1, 4 butane diol, and about 50.7 percent by weight of a terephthalate ester-containing compound.

13. The insulated conductor of claim 12, wherein the composition encompassing the tinsel ribbon has a Durometer hardness on the D scale of approximately 72 and a flexural modulus of about 75,000 psi.

14. The insulated conductor of claim 12, wherein the melting point of the composition encompassing the tinsel ribbon is about 424° F.

15. An insulated conductor, wherein the insulative cover comprises the composition set forth in claim 14 combined with a polyester elastomer comprising about 19.5 percent by weight of 1, 4 butane diol, about 44.8 percent by weight of polytetramethylene glycol having a number average molecular weight of 1000, about 27.4 percent by weight of terephthalic acid, and about 7.9 percent by weight of isophthalic acid.

* * * * *